(12) United States Patent
Potter

(10) Patent No.: US 10,492,583 B1
(45) Date of Patent: Dec. 3, 2019

(54) OPTICAL ILLUSION CONTAINER

(71) Applicant: Anthony B Potter, Crozet, VA (US)

(72) Inventor: Anthony B Potter, Crozet, VA (US)

( * ) Notice: Subject to any disclaimer, the term of this patent is extended or adjusted under 35 U.S.C. 154(b) by 0 days.

(21) Appl. No.: 16/127,454

(22) Filed: Sep. 11, 2018

(51) Int. Cl.
*G06F 19/12* (2011.01)
*A45C 11/34* (2006.01)
*A47G 19/30* (2006.01)
*A47J 47/16* (2006.01)
*A63J 21/00* (2006.01)
*B65D 65/38* (2006.01)

(52) U.S. Cl.
CPC ............ *A45C 11/34* (2013.01); *A47G 21/184* (2013.01); *A47J 47/16* (2013.01); *A63J 21/00* (2013.01); *B65D 65/38* (2013.01)

(58) Field of Classification Search
CPC ....... G09F 19/12; A45C 11/34; A47G 21/184; A47J 47/16; A63J 21/00
USPC .......................................................... 206/214
See application file for complete search history.

(56) References Cited

U.S. PATENT DOCUMENTS

| 9,572,440 B2 * | 2/2017 | Potter | ............... A47G 19/24 |
| 2011/0049068 A1 * | 3/2011 | Potter | ............... A47B 73/00 |
| | | | 211/69.1 |
| 2016/0309933 A1 * | 10/2016 | Potter | ............... A47G 19/24 |

* cited by examiner

Primary Examiner — King M Chu

(57) ABSTRACT

A storage container is provided that exhibits an optical illusion that some of the items stored in the container have disappeared in all or in part.

20 Claims, 2 Drawing Sheets

OPTICAL ILLUSION CONTAINER

CROSS-REFERENCE TO RELATED APPLICATIONS

None

FIELD OF THE INVENTION

The present invention relates to storage containers that provide the optical illusion of at least part of an item stored being invisible.

BACKGROUND OF THE INVENTION

Today's marketplace for storage containers for the home or office is crowded and thriving. It is difficult for merchants and manufacturers in today's market to distinguish their products from the vast array of choices available to the consumer. Adding the novelty of a striking optical illusion to the design of everyday containers adds a new aesthetic and amusement value to them. Especially common in the average household are containers for conveniently storing pens, pencils, scissors, toothbrushes, combs, tubes of toothpaste and ointments, straws, chopsticks, and other kitchen utensils. Places of business can benefit from novel ways of presenting pens and pencils, items for sale, or business cards. Adding an optical illusion to such household and business containers adds a welcome new dimension of enjoyment for the consumer, and adding such an optical illusion to the display of common consumables at the point of sale can give a marketing edge by attracting attention to their novel design.

Magicians have long used the principle of mounting mirrors inside boxes, both small and large in size, to hide small objects, parts of human anatomy such as an arm or a head, or even entire people and animals. The principle is very old and even patented for certain specific uses (see Adams, U.S. Pat. No. 4,023,794).

There is available on the market today a magician's apparatus called a "duck bucket" which utilizes a mirror configuration similar to that of my invention. (see: http://www.owenmagic.com/Livestock/Livestock_2/livestock_2.html) However this apparatus requires skilled presentation by a performer to produce an illusion effect, and does not permit the sensation of items visibly disappearing as they are inserted into the device. It is not a practical means for storing useful every-day objects. Furthermore, it does not employ the method of my invention of extending the mirror up into a non-symmetrical section of the container thereby precluding the likelihood that a mirror is employed in the illusion.

Advertisers have often employed optical illusions that use light reflective surfaces in their displays to attract customers (see William Albert Burns U.S. Pat. No. 1,680,855, A. Trippe-Furst U.S. Pat. No. 1,721,014 and A. G. Steen U.S. Pat. No. 1,740,842).

Manufacturers of toys, games and novelties have employed optical illusions that use light reflective surfaces to enhance the amusement value of their products (see U.S. Pat. No. 4,967,953 Shigeru Sugawara, Suzuki U.S. Pat. No. 5,494,217 and Boles U.S. Pat. No. 4,960,274).

U.S. Pat. No. 5,392,161 employs light reflective surfaces to create a "see through" effect utilizing the reflective principle of a periscope. This "see through" effect differs from the effect of an empty interior space, and it has the limitation that, like a periscope, its virtual images all rely upon multiple reflections in multiple mirrors.

None of these aforementioned devices employs mirrors or other light reflective surfaces as part of the design of a container for storing one or more objects while permitting their easy removal.

U.S. Pat. No. 8,336,720 is a storage rack that employs one or more mirrors to make items disappear. While this device does create the illusion that items stored in it disappear, it is limited to designs whose structures, in their entirety, exhibit one or more planes of symmetry. This storage rack device does not include various framework structures whose symmetry is restricted to only one portion of the structure, as my invention does. Restricting the symmetry of the container to only a portion thereof, and fixing the structure in an unusual orientation for viewing, allow for more counter-intuitive and surprising ways to introduce a mirror into the design. Furthermore, nothing in the prior art or currently for sale on the market employs the use of the optical illusion created with the novel arrangement of light reflective surfaces of my invention to enhance the novelty, amusement and aesthetic value of containers for the practical storage of one or more every-day items found in the typical household or place of business.

SUMMARY OF THE INVENTION

The present invention provides a novel storage container for storing items (e.g., pens, office supplies, chopsticks, kitchen utensils, business cards, canes, umbrellas), wherein the container exhibits an optical illusion that the items have vanished in whole or in part.

The present invention also provides a novel method of providing a novel storage container for storing items, wherein the container exhibits an optical illusion that the items have vanished in whole or in part.

These and other aspects of the present invention have been accomplished in view of the discovery of a storage container as described herein.

BRIEF DESCRIPTION OF THE DRAWINGS

In the drawings, closely related elements have the same number.

DETAILED DESCRIPTION OF THE INVENTION

Figure 1:
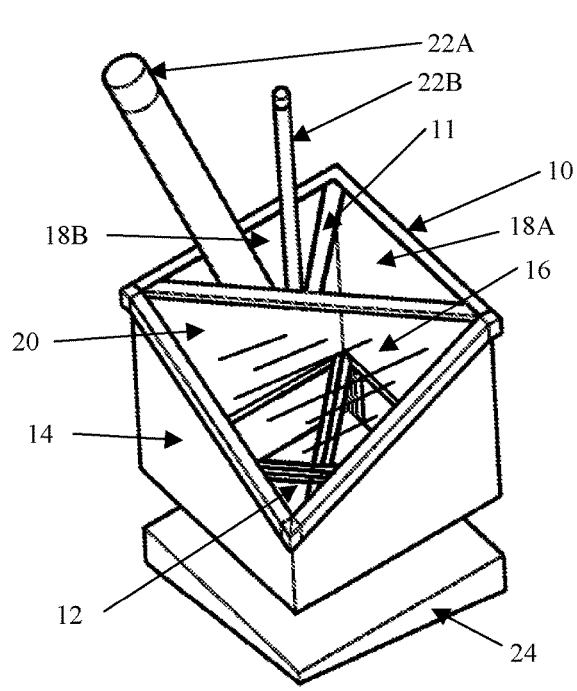
FIG. 1 is a top, front perspective view of an illusion container of my invention.

Incorporating an illusion into the design of a storage container adds novelty, amusement and aesthetic value to a practical means for storing or displaying items. With respect to containers used for display at points of sale, retail sales locations could attract and amuse customers by displaying their products in a container of such a design. Displaying products in a novel and startling manner with such a display can give them a marketing edge. At social occasions displaying household items in a manner that is pleasantly surprising can stimulate intellectual curiosity and start conversations. Hosts at a party might use such a container to entertain guests. Professional and amateur magicians might use an embodiment of my invention which is designed sufficiently large to conceal production items, livestock, or even a person. One or more such apparatuses could be used to create magical effects of production, disappearance. or transposition. In such theatrical applications, the orientation of the containers on stage must carefully consider audience viewing angles. And owners of this storage container might enjoy simply looking at it for the sheer pleasure of experiencing the strong visual illusion effect with a device that stores their office supplies, kitchen utensils, or other household items in a practical fashion.

In an aspect of the invention, a method is provided for designing a container for storing items, which exhibits an optical illusion that the items have vanished in whole or in part.

In another aspect of my invention, a storage container for storing at least one item is provided, comprising:
a. a frame structure for holding the at least one item, comprising: a top element, an opposing bottom element, and at least one connecting member, wherein:
  i. the top element and bottom element are fixed in opposition to each other by the at least one connecting member;
  ii. the bottom element is substantially planar;
  iii. the at least one connecting member is approximately perpendicular to the bottom element;
  iv. the top element, the bottom element, and the at least one connecting member consist of a storage section of the frame structure and a threshold section of the frame structure wherein:
    1. the storage section of the frame structure comprises the bottom element and a portion of the at least one connecting member proximal to the bottom element and extending upward a substantial portion of the distance between the bottom element and the top element; and,
    2. the threshold section of the frame structure comprises the top element and the portion of the at least one connecting member not contained in the storage section of the frame structure;
  v. said storage section of the frame structure having sufficient symmetry such that at least one plane of symmetry exists wherein:
    1. said at least one plane of symmetry is coplanar with a plane extending from the bottom element to the top element;
    2. said at least one plane of symmetry is substantially perpendicular to the bottom element; and,
    3. said at least one plane of symmetry being substantially transverse within the storage section of the frame structure such that said at least one plane of symmetry has a distal side and a proximal side;
  vi. said threshold section of the frame structure having at least one insertion aperture on the distal side of the at least one plane of symmetry sufficiently large to receive at least one of the items to be stored in the container; and,
  vii. said threshold section of the frame structure having at least one viewing aperture located on the proximal side of the at least one plane of symmetry, adjoining said storage section of the frame structure, and sufficiently large to permit an unobstructed view of a substantial portion of the interior of said storage section of the frame structure;
b. at least one light reflective surface disposed in the at least one plane of symmetry within the frame structure in such an orientation as to:
  i. extend between the bottom element and the top element;
  ii. reflect a portion of the interior of the storage section of the frame structure that visually resembles another adjacent portion of the interior of the storage section of the frame structure that is hidden by the at least one light reflective surface; and
  iii. hide from view at least part of the one or more items to be stored; and,
c. optionally, a means for orienting the frame structure in a position that facilitates an unobstructed view of the portion of the proximal side of the at least one light reflective surface disposed in the storage section of the frame structure through the at least one viewing aperture.

An advantage of the illusion created by containers of my invention is to enhance the novelty, amusement and aesthetic value of the container.

In another aspect of my invention, the top element, the bottom element and apertures form a lattice-type structure.

In another aspect of my invention, the shape of the bottom element of the frame structure is a regular polygon. Examples of regular polygons include triangular, substantially square, rectangular, pentagonal, hexagonal, heptagonal, and octagonal.

In another aspect of my invention, the frame further comprises: at least two panels, all substantially similar in appearance to each other, which extend between the opposing top element and bottom element of the frame connecting two or more of the straight edges of the opposing top element and bottom element.

In another aspect of my invention, the shape of the bottom element of the frame structure is circular or an irregular but substantially symmetrical curve. In another aspect the frame, further comprises: at least one curved panel whose curve conforms to the shape of the circumferences of the bottom element, and which extends between the bottom element and the top element along predetermined portions of the circumference of the side of the frame structure.

In another aspect of my invention, the apertures are sufficient to store an item selected from writing utensils (e.g., pens and pencils), measuring instruments (e.g., rulers), office instruments (e.g., scissors and letter openers), and umbrellas.

Examples of the height of the container (i.e., the length of the at least one connecting member) include distances shorter than the length of the item to be stored and at least as long as the length of the item to be stored.

The storage container as described above can be free standing or capable of being mounted on a vertical surface (e.g., a wall). In another aspect of my invention, the frame structure further comprises: at least one leg attached to the frame structure. Additional examples include containers further comprising: at least two legs; at least three legs; at least three legs, wherein the frame is fully supported by the at least three legs; or four legs, wherein the frame structure is fully supported by the four legs. The legs can be present in a number of locations including the frame structure, the opposing top and bottom elements, the panels (if present), and combinations thereof. When the legs are perpendicular to the connecting members, they can be present on the frame and/or the panels. The perpendicular location allows for storage of items substantially parallel to the horizon (e.g., utensil storage on a counter top, table, or bookshelf wherein the utensils are substantially parallel to the horizon). When the legs are parallel to the connecting members, they can be present on the frame and/or the opposing top and bottom elements. The parallel location allows for storage of items substantially perpendicular to the horizon (e.g., pencil storage perpendicular to a desktop on which an appropriately sized container rests).

My invention includes numerous variations with respect to the size of the container and its components. For example, if it is desirable to store office items, the frame structure can be proportioned with appropriate height and width and the apertures appropriately sized to receive writing implements, pairs of scissors, or letter openers. In another example, if it is desirable to store umbrellas or canes, the frame structure can proportioned to rest on a floor with appropriate height and width and the apertures appropriately sized to receive items including canes or umbrellas.

In another aspect of my invention, containers of my invention may be opaque, transparent, or translucent. The frame structure can be fabricated with at least one material selected from: wood, fabric, leather, metal, glass, and a polymeric substance. In other aspects, the glass or plastic can be clear or translucent. In other aspects, the appearance of the frame structure modified to suit certain applications, for example, it can be stained, oiled, varnished, painted, sealed, and/or colored (e.g., colored plastic or glass).

In another aspect of my invention, the light reflective surface is reflective on both of its sides. A benefit of this aspect is that it can enhance the illusion even when the container is viewed from behind the light reflective surface.

In another aspect of my invention, a container is provided wherein: (a) the shape of the bottom element of the frame structure is a regular polygon; (b) the frame structure is fabricated from wood; and, (c) the apertures and at least one connecting member are sufficient to store desk accessories or kitchen utensils.

In another aspect of my invention, a method of enhancing the novelty, amusement, and/or aesthetic value of a storage container by creating the illusion of empty space where one or more items on display reside is provided, comprising:
 a. providing a frame structure for holding the at least one item, comprising: a top element, an opposing bottom element, and at least one connecting member, wherein:
  i. the top element and bottom element are fixed in opposition to each other by the at least one connecting member;
  ii. the bottom element is substantially planar;
  iii. the at least one connecting member is approximately perpendicular to the bottom element;
  iv. the top element, the bottom element, and the at least one connecting member consist of a storage section of the frame structure and a threshold section of the frame structure wherein:
   1. the storage section of the frame structure comprises the bottom element and a portion of the at least one connecting member proximal to the bottom element and extending upward a substantial portion of the distance between the bottom element and the top element; and,
   2. the threshold section of the frame structure comprises the top element and the portion of the at least one connecting member not contained in the storage section of the frame structure;
  v. said storage section of the frame structure having sufficient symmetry such that at least one plane of symmetry exists wherein:
   1. said at least one plane of symmetry is coplanar with a plane extending from the bottom element to the top element;
   2. said at least one plane of symmetry is substantially perpendicular to the bottom element; and,
   3. said at least one plane of symmetry being substantially transverse within the storage section of the frame structure such that said at least one plane of symmetry has a distal side and a proximal side;
  vi. said threshold section of the frame structure having at least one insertion aperture on the distal side of the at least one plane of symmetry sufficiently large to receive at least one of the items to be stored in the container; and,
  vii. said threshold section of the frame structure having at least one viewing aperture located on the proximal side of the at least one plane of symmetry, adjoining said storage section of the frame structure, and sufficiently large to permit an unobstructed view of a substantial portion of the interior of said storage section of the frame structure;
 b. providing at least one light reflective surface disposed in the at least one plane of symmetry within the frame structure in such an orientation as to:
  i. extend between the bottom element and the top element;
  ii. reflect a portion of the interior of the storage section of the frame structure that visually resembles another adjacent portion of the interior of the storage section of the frame structure that is hidden by the at least one light reflective surface; and
  iii. hide from view at least part of the one or more items to be stored; and,
 c. optionally, providing a means for orienting the frame structure in a position that facilitates an unobstructed view of the portion of the proximal side of the at least one light reflective surface disposed in the storage section of the frame structure through the at least one viewing aperture.

In another aspect of my invention, the method further comprises:
 d. disposing at least one item in the storage container.

Figure 2:
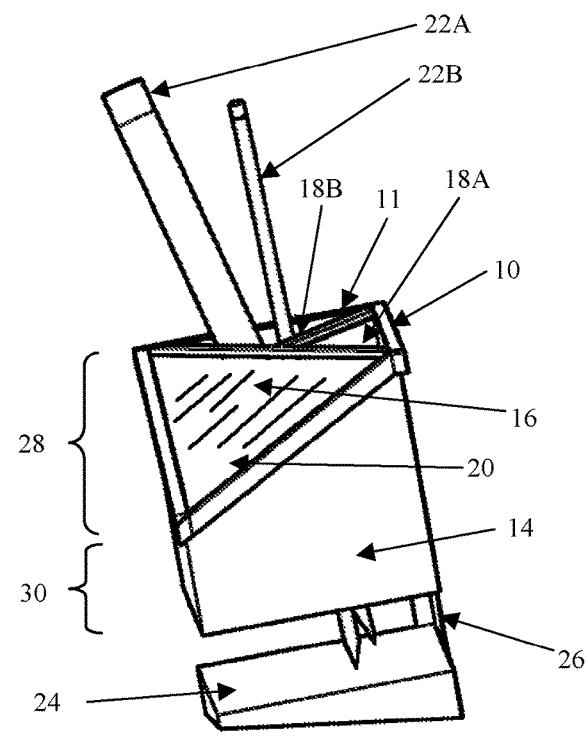
FIG. 2 is a top, right side perspective view of an illusion container of my invention.
Figure 3:
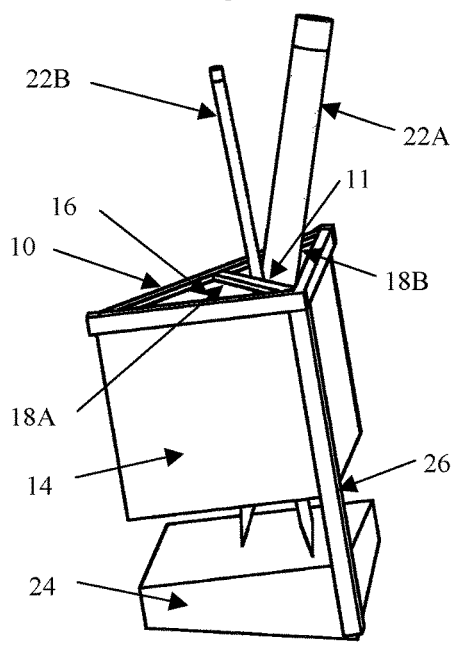
FIG. 3 is a top, rear perspective view of an illusion container of my invention, clearly showing the back of the light reflective surface and the position of the stored items.

Certain aspects of a preferred embodiment of the present invention are depicted in FIG. 1, FIG. 2, and FIG. 3 in the exemplary context of a desk organizer. These figures show a rectangular frame structure 14 with a top element 10 and opposing bottom element 12 that are fixed in position by the four panels of the frame structure. The top element 10 is a triangular lattice-like structure bisected by frame member 11. Apertures 18A and 18B permit the insertion of items to be stored, writing implements 22A and 22B. The bottom element 12 comprises a rectangular lattice-like structure with two cross members disposed on the two diagonals of the bottom element. Light reflective surface 16 is disposed along one diagonal of the lattice-like structure, the top and bottom edges of which are concealed by cross members of the top element and the bottom element.

In this embodiment, apertures in the bottom element permit items stored to pass through the frame structure to rest on the external base 24 below the frame. FIG. 2 shows the two conceptual parts of the container's frame structure, the threshold section of the frame structure 28 and the storage section of the frame structure 30. Unlike the threshold section, the storage section is symmetrical about the plane in which the light reflective surface 16 lies. The light reflective surface bisects the storage section of the container along a plane of symmetry, reflecting the empty front half of the storage section of the container in a manner that creates the illusion that the back half of the storage section of the container is empty too. The back half of the image of the bottom element 12 in FIG. 1 is actually a reflection of the front half of the bottom element on the light reflective surface.

The base 24 and supporting brace 26 together support the frame above it's resting surface and serve as a means to orient the container so that a typical viewer, seated or standing beside a desk or table on which the container rests, can see clearly into the storage section of the container. The light reflective surface hides the writing implements 22A and 22B from view. The orientation of the container also eliminates undesireable reflections of the threshold section of the container, which would confound the illusion of an empty space because the threshold section is non-symmetrical about the plane of the light reflective surface.

FIG. 3 showing the back of the storage container clearly shows the back of the light reflective surface 16 thereby making clear the exact location of the light reflective surface relative to the top element 10 and the items 22A and 22B.

Figure 4:
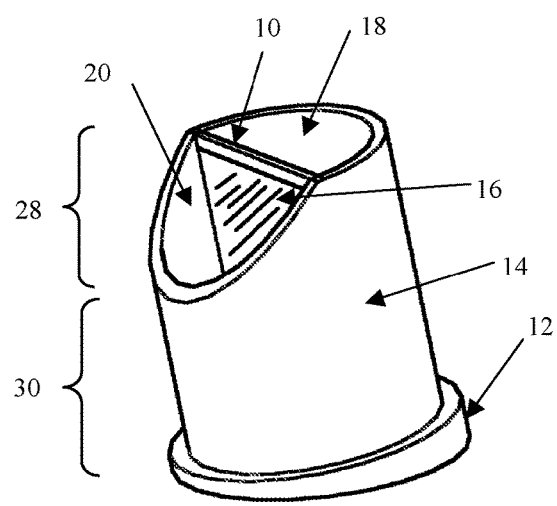
FIG. 4 is another embodiment of an illusion container of my invention using a cylindrical design with an angular base.

FIG. 4 shows another preferred embodiment of my invention, in the exemplary context of a container for office implements or kitchen utensils, wherein the frame structure comprises a cylindrical solid panel 14. The light reflective surface 16 lies on a plane which bisects the circular cross-section of the lower portion of the container. The top element consists of a single cross member 10 to conceal the top edge of the light reflective surface. This example illustrates how the structure of the top element can, in preferred embodiments, conceal the top edge, or edges, of the light reflective surface, and need not be a more complex structure than what is required to accomplish that objective. A single aperture 18 in the threshold section of the frame structure 28 of the container behind the light reflective surface permits the inserting of items to be stored behind the light reflective surface. Aperture 20 in the threshold section of the frame structure of the container in front of the light reflective surface permits viewers to see through the threshold section of the container into the storage section of the frame structure 30 of the container. In this embodiment, the bottom element 12 consists of a wedge-shaped base component which supports the items stored as well as orienting the container to facilitate viewing of the interior of the storage section of the container. Materials used to construct this aspect and other aspects can be opaque or translucent, though a translucent material can enhance the illusion.

The two containers of my invention illustrated in FIGS. 1-3 and FIG. 4 both embody frames with threshold sections that are non-symmetrical about the plane of the light reflective surface. However, my invention is not limited to such embodiments. For example, the container of FIG. 4 could be modified so that the portion of the threshold section of the frame behind the light reflective surface slopes downward to match the front portion of the container. So doing would make the entire container symmetrical about the plane of the light reflective surface. In such more fully symmetrical embodiments of my invention, it is possible to modify the angle of orientation closer to vertical, thereby permitting the viewing of a reflection not only of the interior of the storage section of the container, but also of a portion of the threshold section of the container. The impression thus created is that of looking into the bottom of the container, but also looking through the open framework of the threshold section of the frame. Such embodiments can be particularly effective in theatrical presentations of the illusion wherein careful control of the context and background of the container assures that reflections in the light reflective surface do not reveal the means of creating the illusion of an empty container.

Figure 5:
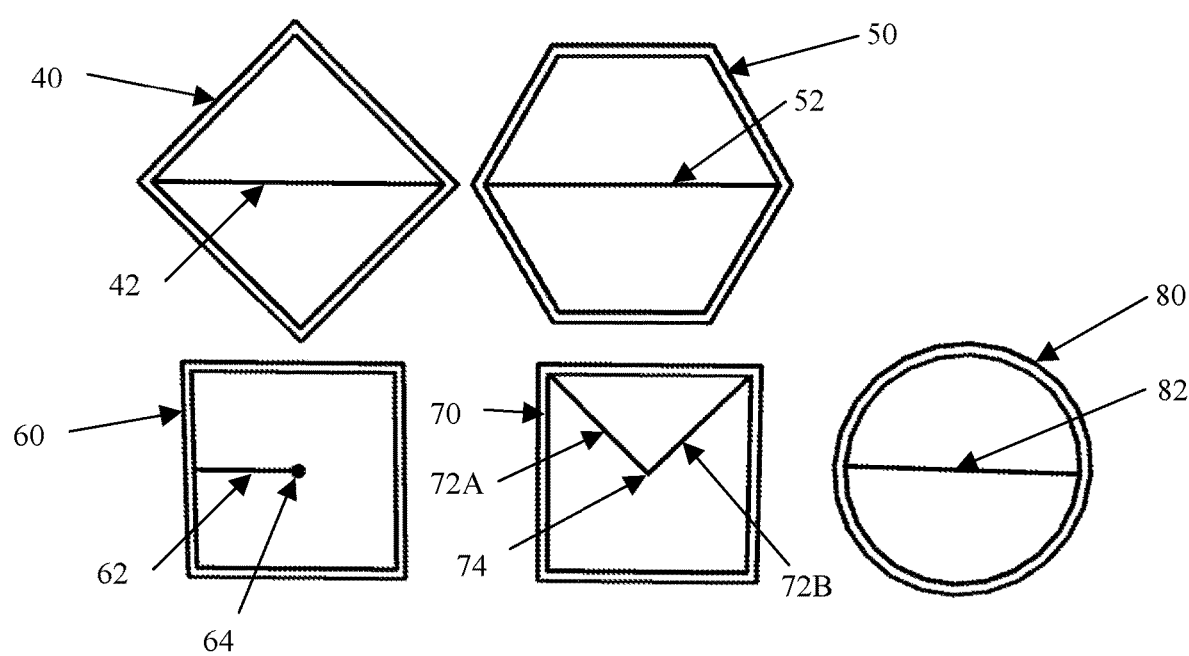
FIG. 5 presents cross-sectional views of various possible light reflective surface configurations in variously shaped illusion containers of my invention.

FIG. 5 presents cross-sectional views of the storage section of illusion containers of my invention using various configurations of the placement of light reflective surfaces 42, 52, 62, 72A, 72B, and 82 within variously shaped container frame structures 40, 50, 60, 70 and 80. In these examples, joints where the light reflective surfaces meet 74 or edges 64 of light reflective surfaces exposed in the middle of the container can be concealed by connecting members (e.g., thin rods) extending between the top element and the bottom element of the frame structure. What these configurations all have in common is that shape of the storage section of the frame structure and the position of each light reflective surface within each frame structure assure that the reflected images in the light reflective surfaces substantially match what the empty space behind would look like were the light reflective surfaces absent. These configurations of light reflective surface placement represent, without limitation, other possible aspects of the invention.

When panels are not present in connecting members of my invention, then it is desirable to place the container in an environment, such as on a bookcase, where the surface below the container substantially matches the surface behind the container thereby assuring that the reflection of the surface below and in front of the light reflective surface matches the surface behind the light reflective surface.

Other variations on my invention are included in my invention. These variations include, but are not limited to the following.

A frame structure, or container, with apertures in the sides enlarged sufficiently to receive more than one item (e.g., scissors or mixing spoon).

A container in which the light reflective surface or surfaces are hinged so that they can be moved out of position thereby hiding the effect until desired.

A container in which the light reflective surface or surfaces can be easily removed so that the container can be closely inspected without revealing the method of its creating the optical illusion effect.

A container which has a removable door or cloth which covers the viewing aperture in the threshold section to hide the inside of the container when desired thereby permitting more dramatic effect when displaying the illusion A container whose apertures in the threshold section of the frame structure are holes cut into a solid panel A container with two or more light reflective surfaces positioned in any one of various configurations to hide one or more spaces within the container A container which is oriented horizontally in such a manner that the top element is on one side of the container (e.g. the left-hand side) and the opposing bottom element is on the other side of the container (e.g. the right-hand side).

Numerous modifications and variations of the present invention are possible in light of the above teachings. It is therefore to be understood that within the scope of the appended claims, the invention may be practiced otherwise than as specifically described herein.

What is claimed is:
1. A container for storing at least one item, comprising:
   a. a frame structure for holding the at least one item, comprising: a top element, an opposing bottom element, and at least one connecting member, wherein:

i. the top element and bottom element are fixed in opposition to each other by the at least one connecting member;
ii. the bottom element is substantially planar;
iii. the at least one connecting member is approximately perpendicular to the bottom element;
iv. the top element, the bottom element, and the at least one connecting member consist of a storage section of the frame structure and a threshold section of the frame structure wherein:
  1. the storage section of the frame structure comprises the bottom element and a portion of the at least one connecting member proximal to the bottom element and extending upward a substantial portion of the distance between the bottom element and the top element; and,
  2. the threshold section of the frame structure comprises the top element and the portion of the at least one connecting member not contained in the storage section of the frame structure;
v. said storage section of the frame structure having sufficient symmetry such that at least one plane of symmetry exists wherein:
  1. said at least one plane of symmetry is coplanar with a plane extending from the bottom element to the top element;
  2. said at least one plane of symmetry is substantially perpendicular to the bottom element; and,
  3. said at least one plane of symmetry being substantially transverse within the storage section of the frame structure such that said at least one plane of symmetry has a distal side and a proximal side;
vi. said threshold section of the frame structure having at least one insertion aperture on the distal side of the at least one plane of symmetry sufficiently large to receive at least one of the items to be stored in the container; and,
vii. said threshold section of the frame structure having at least one viewing aperture located on the proximal side of the at least one plane of symmetry, adjoining said storage section of the frame structure, and sufficiently large to permit an unobstructed view of a substantial portion of the interior of said storage section of the frame structure;
b. at least one light reflective surface disposed in the at least one plane of symmetry within the frame structure in such an orientation as to:
  i. extend between the bottom element and the top element;
  ii. reflect a portion of the interior of the storage section of the frame structure that visually resembles another adjacent portion of the interior of the storage section of the frame structure that is hidden by the at least one light reflective surface; and
  iii. hide from view at least part of the one or more items to be stored; and,
c. optionally, a means for orienting the frame structure in a position that facilitates an unobstructed view of the portion of the proximal side of the at least one light reflective surface disposed in the storage section of the frame structure through the at least one viewing aperture;
wherein when an object to be stored is placed into the at least one insertion aperture, and into the frame structure, all or part of the item stored in the frame structure is hidden from view, when viewed through the at least one viewing aperture, by the at least one light reflective surface.

2. The container of claim 1, wherein the top element and bottom element and apertures form a lattice-type structure.

3. The container of claim 1, wherein the shape of a cross-section of the storage section of the frame structure parallel to the lower element of the frame structure is a regular polygon.

4. The container of claim 3, wherein the regular polygon is selected from: triangular, substantially square, rectangular, pentagonal, hexagonal, heptagonal, and octagonal.

5. The container of claim 1 wherein the bottom element is a solid surface on which the objects stored rest.

6. The container of claim 1, wherein the bottom element has at least one pair of visually similar apertures symmetrically positioned on either side of the at least one light reflective surface permitting an object stored to extend visibly below said container while resting on a fixed surface below and external to said container.

7. The container of claim 3, wherein the frame, further comprises: at least two panels, all substantially similar in appearance to each other, which extend between the top element and the bottom element of the frame connecting two or more of the straight edges of the top element and the bottom element.

8. The container of claim 1, wherein the shape of a cross-section of the storage section of the frame structure parallel to the lower element of the frame structure is circular or an irregular but substantially symmetrical curve.

9. The container of claim 8, wherein the frame, further comprises: at least one curved panel which extends between the top element and the bottom element along predetermined portions of the edges of the top element and the bottom element of the frame structure, the curved panel being positioned such that the reflection in the light reflective surface of at least part of the curved panel appears to the observer to be a different part of the curved panel.

10. The container of claim 1, wherein the apertures are sufficient to store an item selected from: writing utensils, measuring instruments, office instruments, kitchen utensils, straws, canes, umbrellas, and persons.

11. The container of claim 1, wherein the distance between the top element and the bottom element of the container is shorter than the length of the item to be stored.

12. The container of claim 1, wherein the distance between the top element and the bottom element of the container is at least as long as the length of the item to be stored.

13. The container of claim 1, wherein the frame structure permits mounting the container on a vertical surface.

14. The container of claim 1, wherein the means for orienting the frame structure to facilitate an unobstructed view into the storage section of the frame structure of the container is at least one leg attached to the frame structure.

15. The container of claim 1, wherein the means for orienting the frame structure to facilitate an unobstructed view into the storage section of the frame structure of the container is a base component external to the frame structure and supporting the frame structure with one or more connecting members.

16. The container of claim 1, wherein the means for orienting the frame structure to facilitate an unobstructed view into the storage section of the frame structure of the container is a wedge-shaped base, either external to the frame structure and supporting the frame structure with one or more connecting members, or as an integral part of the bottom element.

17. The container of claim 1, wherein the frame structure is fabricated with at least one material selected from: wood, fabric, leather, metal, glass, and a polymeric substance.

18. The container of claim 1, wherein the one or more light reflective surface is reflective on both of its sides, and the insertion aperture and the viewing aperture are functionally interchangeable.

19. The container of claim 1, wherein: (a) the shape of the bottom element of the frame structure is square, rectangular, or heaxagonal; (b) the frame structure is fabricated from wood; and, (c) the insertion apertures and at least one connecting member are sufficient to store desk accessories or kitchen utensils.

20. A method of enhancing the novelty, amusement, and/or aesthetic value of a container by creating the illusion of empty space where one or more items on display reside, comprising:
 a. providing a frame structure for holding the at least one item, comprising: a top element, an opposing bottom element, and at least one connecting member, wherein:
  i. the top element and bottom element are fixed in opposition to each other by the at least one connecting member;
  ii. the bottom element is substantially planar;
  iii. the at least one connecting member is approximately perpendicular to the bottom element;
  iv. the top element, the bottom element, and the at least one connecting member consist of a storage section of the frame structure and a threshold section of the frame structure wherein:
   1. the storage section of the frame structure comprises the bottom element and a portion of the at least one connecting member proximal to the bottom element and extending upward a substantial portion of the distance between the bottom element and the top element; and,
   2. the threshold section of the frame structure comprises the top element and the portion of the at least one connecting member not contained in the storage section of the frame structure;
  v. said storage section of the frame structure having sufficient symmetry such that at least one plane of symmetry exists wherein:
   1. said at least one plane of symmetry is coplanar with a plane extending from the bottom element to the top element;
   2. said at least one plane of symmetry is substantially perpendicular to the bottom element; and,
   3. said at least one plane of symmetry being substantially transverse within the storage section of the frame structure such that said at least one plane of symmetry has a distal side and a proximal side;
  vi. said threshold section of the frame structure having at least one insertion aperture on the distal side of the at least one plane of symmetry sufficiently large to receive at least one of the items to be stored in the container; and,
  vii. said threshold section of the frame structure having at least one viewing aperture located on the proximal side of the at least one plane of symmetry, adjoining said storage section of the frame structure, and sufficiently large to permit an unobstructed view of a substantial portion of the interior of said storage section of the frame structure;
 b. providing at least one light reflective surface disposed in the at least one plane of symmetry within the frame structure in such an orientation as to:
  i. extend between the bottom element and the top element;
  ii. reflect a portion of the interior of the storage section of the frame structure that visually resembles another adjacent portion of the interior of the storage section of the frame structure that is hidden by the at least one light reflective surface; and
  iii. hide from view at least part of the one or more items to be stored; and,
 c. optionally, providing a means for orienting the frame structure in a position that facilitates an unobstructed view of the portion of the proximal side of the at least one light reflective surface disposed in the storage section of the frame structure through the at least one viewing aperture.

\* \* \* \* \*